May 3, 1955 G. HILL 2,707,504
PIE SLICING MACHINE
Filed Oct. 3, 1951 3 Sheets-Sheet 1

INVENTOR
Gordon Hill
BY Evans + McCoy
ATTORNEYS

May 3, 1955 G. HILL 2,707,504
PIE SLICING MACHINE
Filed Oct. 3, 1951 3 Sheets-Sheet 2

INVENTOR
Gordon Hill
BY Evans + McCoy
ATTORNEYS

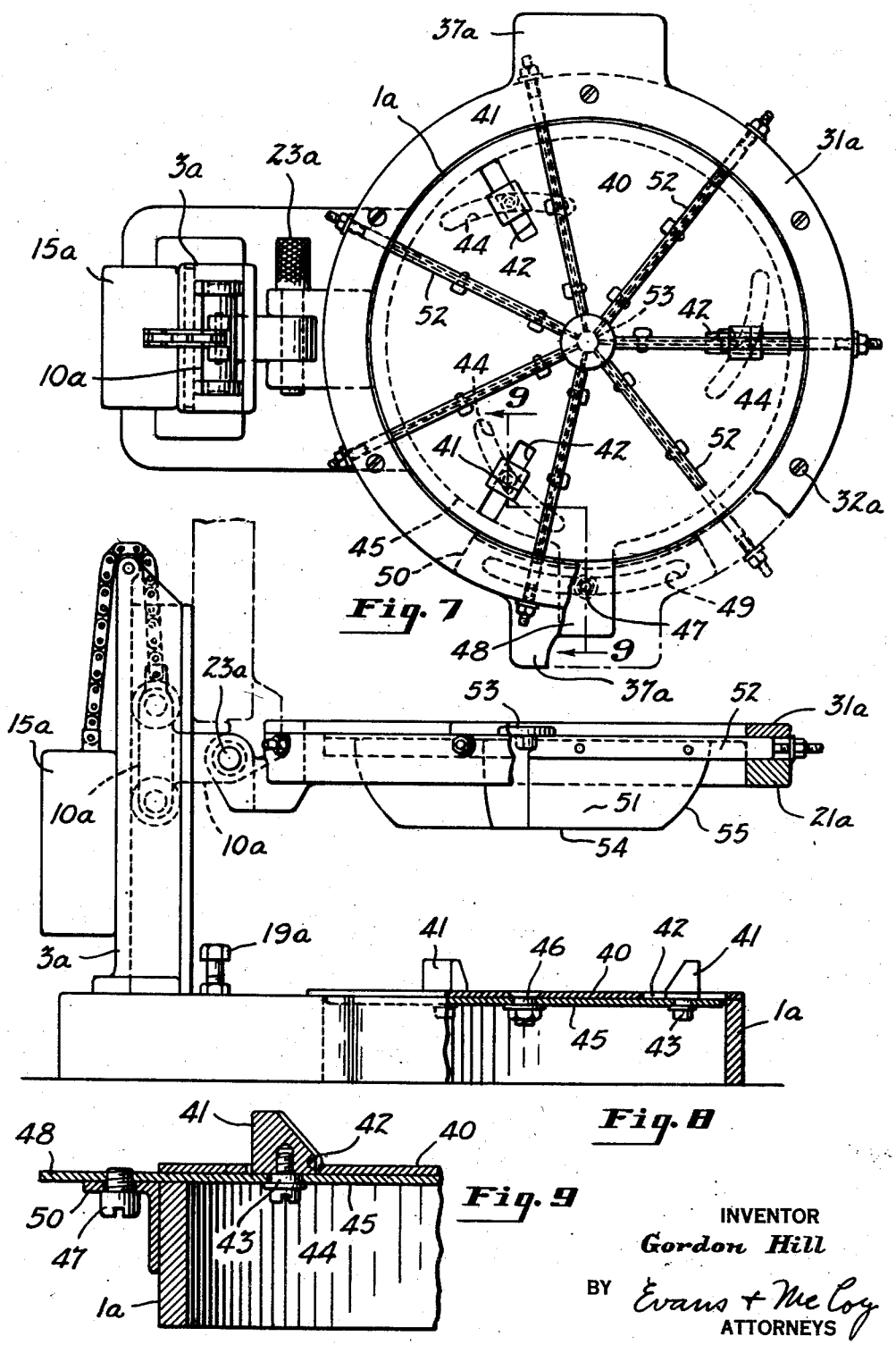

United States Patent Office 2,707,504
Patented May 3, 1955

2,707,504

PIE SLICING MACHINE

Gordon Hill, Davenport, Iowa, assignor, by mesne assignments, to Bettendorf Bakery Equipment Company, Bettendorf, Iowa, a corporation of Iowa Application October 3, 1951, Serial No. 249,502

5 Claims. (Cl. 146—160)

This invention relates to slicing machines for dividing articles of circular form such as pies into sectors.

In the device of the present invention a pie supporting table or platform is provided and a cutter having slicing blades that radiate from a central vertical axis is mounted for vertical movement into and out of engagement with a pie on the table, the table being provided with means for centering the pie with respect to the cutter and means being provided for limiting the downward movement of the cutter at a point where the cutting edges of the blades have passed through a pie on the table but are out of contact with the table. The cutter is preferably mounted on a vertically slidable carriage which is so counter-balanced that it will be retained by friction at any position to which it is moved and which can be easily moved manually to impart a cutting stroke to the cutter end, for convenience in placing pies upon the table and in removing the sliced pies and to facilitate cleaning of the pie table and cutter, the cutter is preferably hinged to the vertically movable carriage for movement from its operative position in which the slicer blade carrier is disposed horizontally to an inoperative position in which the slicer blade carrier is disposed vertically and laterally clear of the pie support.

In one embodiment of the invention the pie supporting table is in the form of a pedestal on which a pie may be positioned and the vertically movable cutter has radial slicing blades mounted in a carrying ring that is of a size to receive the pedestal, the cutter being mounted for vertical movement from a position above and clear of the pedestal to a position in which the blade carrying ring surrounds the pedestal and the pie receiving top of the pedestal being provided with radial grooves to receive the cutter blades, these grooves being preferably of a depth greater than the height of the blades to permit the blades to move through the pie and into the grooves where they are entirely below the sliced pie.

Objects of the invention are to provide a slicer of simple and rugged construction for quickly and accurately slicing pies in a restaurant or the like, to provide a slicing machine from which the individual slices may be removed one at a time as needed, and to provide a slicer in which the parts are readily accessible and quickly detachable for cleaning or replacement.

Reference should be had to the accompanying drawings forming a part of this specification, in which:

Fig. 7 is a top plan view showing a modified form of slicing machine embodying the invention in which the pie remains in a pie plate while being sliced;

Fig. 8 is a side elevation of the machine shown in Fig. 7 with portions of the table and cutter ring broken away and shown in vertical section; and Fig. 9 is a vertical section taken on the broken line 9—9 as indicated in Fig. 7.

Figure 1:
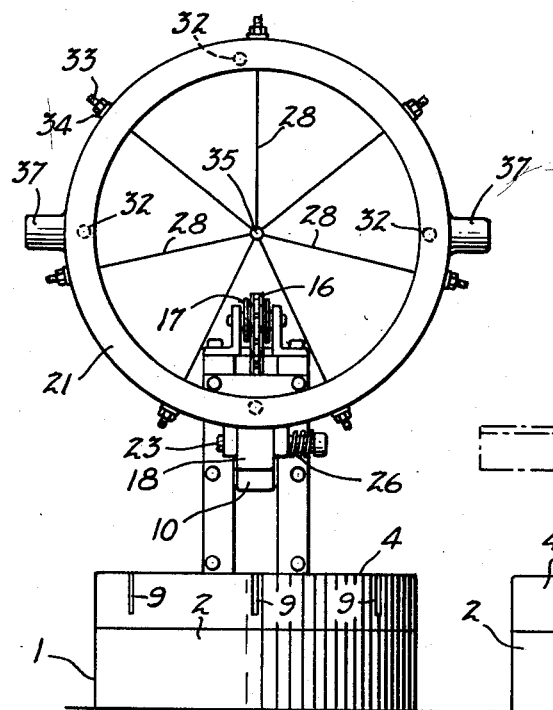
Figure 1 is a front elevation of a slicer embodying the invention showing the cutter in its elevated inoperative position.

The slicing machine of the present invention as illustrated in Figs. 1 to 6 of the accompanying drawings is provided with a supporting base 1 which carries a pie supporting table or platform in the form of a pedestal 2 that projects upwardly from the base and a standard 3 spaced from the pedestal to the rear thereof. The pedestal 2 has a top 4 upon which the pie to be sliced may be positioned, the pedestal top 4 being preferably detachably connected to the pedestal body so that it can be quickly and easily removed for cleaning or for replacement with another top. For positioning the top 4 on the pedestal body a plurality of dowels 5 are provided on the under side of the top 4 which fit in sockets 6 in the body of the pedestal. The top 4 preferably has its top face recessed to provide a pie receiving well 7 in which the pie to be sliced fits. The top 4 has an opening or recess 8 at its center and radial grooves 9 extend from the central recess 8 to the periphery of the top. The grooves 9 are narrow, relatively deep grooves, the bottoms of which extend horizontally from the central recess 8 to the periphery of the pedestal.

The standard 3 is of channel shape and is positioned with its channel facing forwardly toward the pedestal 2. A carriage 10 is mounted for vertical travel in the channel of the standard and is provided with upper and lower pairs of rollers 11 and 12 which are guided between the web of the standard and retaining plates 13 secured by means of bolts 14 to the front face of the standard at opposite sides of the channel. The carriage 10 is counterbalanced by a weight 15 which is connected to the carriage by means of a chain 16 extending over a sprocket 17 at the top of the standard 3. The plates 13 are spaced apart to accommodate a portion 18 of the carriage that projects forwardly through the space between the retaining plates 13. The downward movement of the carriage is limited by a post 19 that is mounted on the base 1 directly beneath the portion 18 of the carriage for engagement with the under side thereof. The post 19 is preferably threaded in the base 1 so that it can be adjusted vertically to properly space the cutter blades from the bottoms of the groove 9 at their lower limit of movement. The upward movement of the carriage 10 is limited by a crossbar 20 secured to the plates 13 and extending across the space between the plates for engagement with the top of the projecting portion 18 of the carriage.

Figure 4:
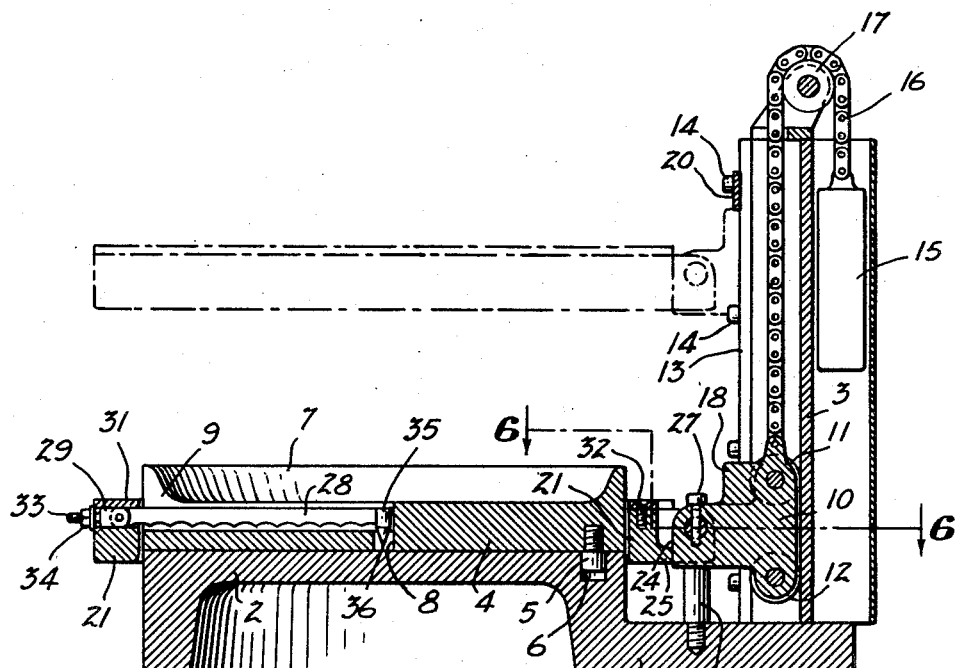
Fig. 4 is an enlarged central vertical section through the pie supporting pedestal, the cutter and its carrier, the cutter unit being shown in broken lines in its lowered position prior to the slicing operation, and in full lines in its lowermost position which it occupies after the slicing operation.
Figure 5:
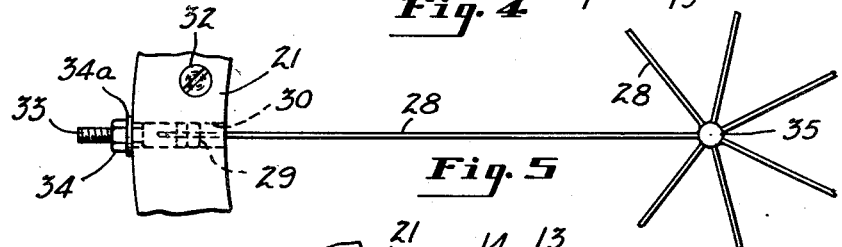
Fig. 5 is a fragmentary detail view showing the manner in which the slicer blades are connected at their center and the manner in which the blades are attached to the supporting ring.
Figure 6:
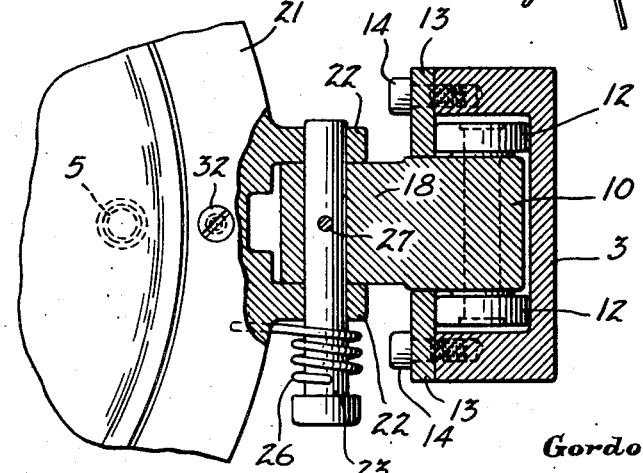
Fig. 6 is a fragmentary horizontal section on an enlarged scale taken on the line indicated at 6—6 in Fig. 4.

The carriage 10 provides a vertically movable support for a cutter assembly that includes a blade carrying frame in the form of a ring 21 that is of an internal diameter slightly greater than the external diameter of the pedestal 2 and which is adapted to be positioned on the carriage in axial alinement with the pedestal 2 so that when the carriage is moved to its lowermost position the ring 21 is brought to a position surrounding the pedestal as is shown in Fig. 4 of the drawings. The ring 21 is provided with hinge lugs 22 (Fig. 6) that straddle the projecting portion 18 of the carriage and that receive a hinge pin 23 that extends through the projecting portion 18 of the carriage and through the lugs 22. The ring 21 swings from its vertical position shown in Figs. 1 and 2 to a horizontal position where it is alined axially with the pedestal 2. In order to support the ring in its horizontal position the projection 18 is provided with a flat front face 24 which is engaged by an integral lug 25 on the ring 21 positioned adjacent the bottom edge of the ring.

Figure 2:
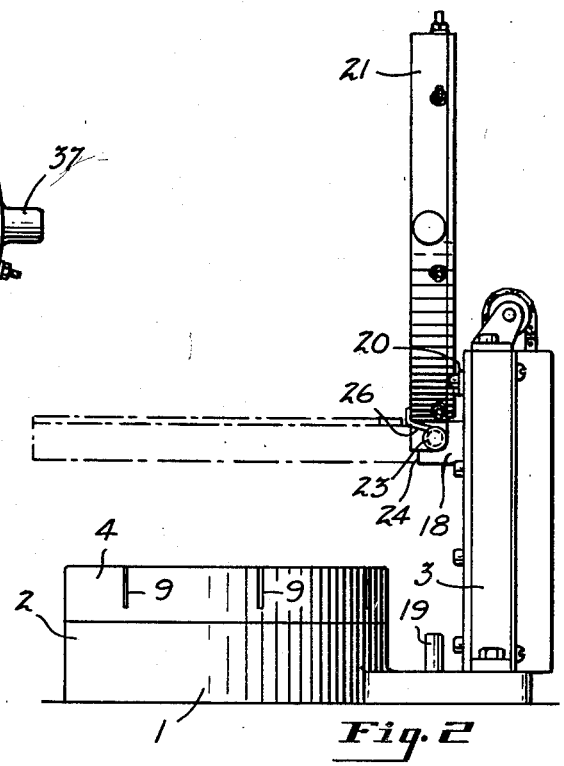
Fig. 2 is a side elevation of the slicer shown in Fig. 1 the broken line illustration showing the cutter unit in lowered position prior to the slicing operation.
Figure 3:
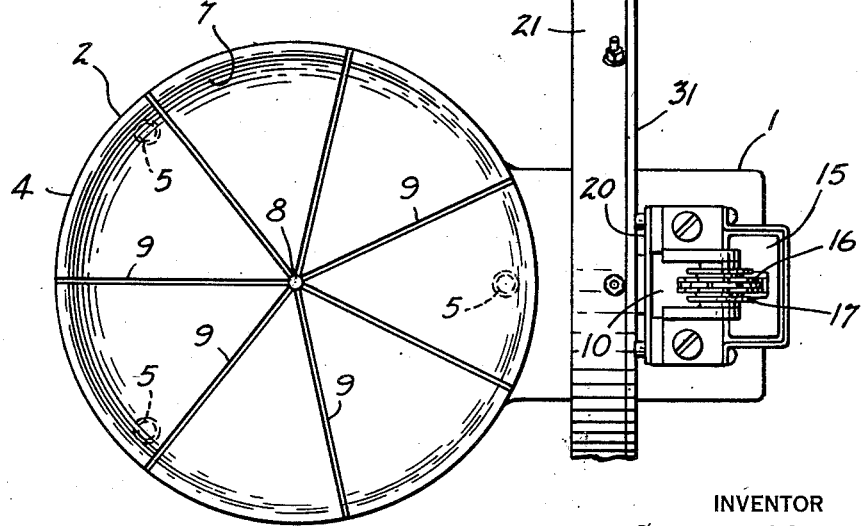
Fig. 3 is a top plan view of the slicer shown in Fig. 1.

When the ring 21 is swung to its upright position slightly past the vertical, shown in full lines in Fig. 2, a peripheral portion of the ring 21 engages the top face of the projecting portion 18 of the carriage to limit swinging movement and support the ring in its upright position. The ring may be mounted to move slightly past a vertical position so that it will be held by gravity in its upright position. To assist in retaining the ring in its upright position and to partially support the ring during its downward swinging movement a coil spring 26 may be mounted on the pin 23 with one end secured to the pin 23 and its opposite end engaging the bottom of the ring 21. The pin 23 is held against endwise or turning movement in the projection 18 by means of a removable pin 27. The spring 26 is tensioned upon downward swinging movement of the ring and exerts a slight thrust on the ring 21 when the ring is in its upright position to retain it in its upright position after it has been moved manually to that position. The weight 15 substantially counterbalances the carriage 10 and ring 21 so that the carriage and ring will be retained by friction in any position to which the carriage may be moved manually and may be easily moved up and down manually.

The ring 21 supports a series of radially disposed slicer blades 28 that are preferably equiangularly spaced and which have blocks 29 attached to their outer ends which fit in radial slots 30 formed in the top face of the ring 21. The blocks 29 are retained in the slots 30 by means of an annular retaining plate 31 which is secured to the top face of the ring 21 by means of screws 32.

Threaded pins 33 are attached to the blocks 29 and extend radially outwardly therefrom. The threaded pins 33 receive nuts 34 which bear against washers 34a interposed between the nuts and the periphery of the ring 21. The inner ends of the radial blades 28 are connected at their inner ends by means of a vertically disposed center pin or punch 35 of small diameter to which the inner ends of the blades 28 may be rigidly attached in any suitable manner such as by brazing their ends in slots formed in the pin 35. The center pin 35 has a pointed lower end 36 which projects below the cutting edges of the blades 28 to facilitate the passage of the joined ends of the blades through the center of a pie. By adjusting the nuts 34 on the ends of the threaded pins screwed to the outer ends of the radial blades, the blade assembly may be properly tensioned and properly located so that the center pin or punch is axially alined with the central recess 8 of the pedestal.

The blades 28 are preferably thin, flexible steel blades with sharpened scalloped edges such as are commonly used in bread slicing machines. As shown in Fig. 4, the depth of the radial grooves 9 in the pedestal top 4 is greater than the height of the blades 28 so that when the slicing unit has moved to its lowermost position as shown in Fig. 4, the ring 21 is below the top of the pie well 7 and the blades 28 are in the groove 9 entirely below the bottom of the well 7.

In the operation of the machine the pie to be sliced is placed in the well 7 which centers the pie with respect to the cutter, the ring 21 is swung down to its horizontal position, and the cutter ring and carriage 10 are then moved downwardly until the carriage 10 is stopped by the post 19 which is so positioned that the cutting edges of the blades 28 when stopped within the grooves 9 are out of contact with the bottom of the grooves. This movement of the carriage and cutter ring causes the radial blades 28 to move entirely through a pie in the well 7, leaving the sliced pie entirely clear of the cutter. The carriage and cutter ring preferably remain in their lowermost position until the sliced pie has been removed from the well 7.

In order to facilitate the actuation of the slicer manually, diametrically opposite handles 37 are provided on the ring 21 which may be grasped to swing the ring forwardly from its upright position to the position shown in dotted lines in Fig. 4 and to then move the ring downwardly to the position shown in full lines in Fig. 4.

The top 4 can be quickly and easily removed at any time for cleaning or for replacement with another top by simply lifting it off the pedestal and, in order to insure accurate alinement of the grooves of the top 9 with the slicer blades 28, the dowels 5 are arranged unsymmetrically so that the dowels 5 will fit in the sockets 6 in only one position of the top, the grooves 9 being so disposed with respect to the dowels that vertical alinement of the radial grooves 9 with the radial blades 28 is insured.

In Figs. 7 to 9 a modified form of the invention is disclosed which is designed to slice pies held in containers such as pie plates and capable of retaining the juice of pies such as berry pies that have a considerable liquid content. This modification is substantially like that shown in Figs. 1 to 6 except with respect to the structure of the pie support and with respect to the form of slicer blades employed. Parts corresponding to parts shown in Figs. 1 to 6 and above described are indicated in Figs. 7, 8 and 9 by the same reference numerals with the addition of the letter a.

The pie support differs from that shown in Figs. 1 to 6 in that a flat top table 40 is provided upon which a pie container such as a pie plate may be placed. The table 40 is provided with radially adjustable lugs 41 for centering a pie plate on the table. Each of the lugs 41 is slidably mounted in radial slots 42 in the table 40 and each lug has a pin 43 projecting downwardly from the bottom thereof and through slots 44 in a disk 45 that turns about a pivot pin 46 disposed centrally of the table 40 and in alinement with the axis of the cutter ring 21a. The disk 45 is positioned immediately beneath the table 40 and the slots 44 are disposed at acute angles to the slots 42 and have the same inclination with respect to radii through the pins 43 so that the lugs 41 may be adjusted simultaneously and equally toward and away from the center pivot pin 46 upon angular adjustment of the disk 45. The disk 45 is locked in the desired position of adjustment by means of a screw 47 threaded in an extension 48 of the disk 44 and extending through an arcuate slot 49 in an angle bracket 50 secured to the base 1a. When loosened the screw 47 permits the disk 44 to be moved angularly about its pivot to adjust the lugs 41 radially and when tightened the screw 47 secures the disk 44 and lugs 41 in adjusted position.

The cutter assembly differs from that shown in Figs. 1 to 6 in that radial slicer blades 51 are provided that project below their support a distance greater than the depth of the pie to be cut so that the slicer blades can pass through the pie without bringing the blade support into engagement with the pie. The blades 51 are detachably secured to radially disposed bars 52 that are attached at their inner ends to a center pin 53 that is axially alined with the pivot 46 and secured at their outer ends in a ring 21a. The ring 21a is pivoted to a vertically movable carriage 10a, the downward movement of which is limited by a vertically adjustable stop 19a. The blades 51 have straight bottom edges 54 and end edges 55 which are shaped to conform to the plate containing the pie. The pie plate is held against lateral movements on the table 40 by the lugs 41 which when adjusted into contact with the pie plate center the pie plate with respect to the cutters. Slicer blades 51 are provided which are of a length corresponding to the radius of the pie and the stop 19a is adjusted to stop the downward movement of the carriage at a point where the edges 54 and 55 are substantially contiguous to the bottom and peripheral walls of the pie plate so that the pie will be sliced without damaging the pie plate.

It is to be understood that in accordance with the provisions of the patent statutes, variations and modifications of the specific devices herein shown and described may be made without departing from the spirit of the invention.

What I claim is:

1. A slicer for dividing a pie or similarly shaped articles into sectors comprising a pie supporting table, a standard at one side of said table, a carriage slidable on said standard, a cutter assembly comprising a frame and a series of angularly spaced slicer blades carried by said frame and extending radially from a central axis, a horizontal pivot connecting said frame to said carriage laterally of said table for vertical swinging movement, said carriage and frame having portions that interengage to limit swinging movement of the frame and that support said frame in upright position laterally of said table or in a position in which said slicer blades are in horizontal position overlying said table, and a vertically adjustable stop positioned laterally of the table in the path of said carriage to limit the downward cutting stroke of said cutter assembly.

2. A slicer for dividing a pie or similarly shaped article into sectors comprising a pie supporting table, a carrier mounted for vertical movement and positioned laterally of said table, a cutter assembly comprising a ring and angularly spaced slicer blades attached thereto and extending radially inwardly therefrom, a horizontal hinge connection between the periphery of said ring and said carrier, said hinge connection being disposed laterally of said table and permitting vertically swinging movement of said assembly from a horizontal slicing position overlying said table to a vertical position laterally clear of said table, and means on said table for centering a pie with respect to said cutter assembly.

3. A slicer for dividing a pie or similarly shaped article into sectors comprising a pie supporting table having a flat top, a series of pie centering lugs mounted for radial movements on said table toward and away from a central vertical axis, means for simultaneously and equally moving said lugs toward or away from said axis, a standard at one side of said table, a carriage movable vertically on said standard, a ring connected at its periphery by a horizontal pivot to said carriage to swing from a vertical position to a horizontal position overlying said table and concentric with said axis, a series of angularly spaced bars carried by said ring and extending from said central vertical axis to said ring, and a flat blade rigidly attached to each of said bars and extending downwardly below said ring, said blades having cutting edges in a horizontal plane spaced below said bars a distance greater than the height of a pie to be cut.

4. A slicer for dividing a pie or similarly shaped article into sectors comprising a cutter having a ring, a pin of small diameter throughout its length with a pointed lower end and a vertical axis disposed centrally of the ring, thin flexible radial blades with horizontal lower edges extending from the small diameter pin to said ring and means carried on said ring to tension each of said blades, said blades forming the sole support for said pin, a pedestal of a size to be received within said ring and having a top provided with a central flat-bottomed well shaped to receive and to position a pie, the flat bottom of said well having a central pin receiving recess and narrow blade receiving grooves extending radially from said recess to the periphery of said top, said recess being of a depth greater than the height of said pin and said grooves being of a depth greater than the height of said blades, and means for supporting said cutter for vertical movement with its pin and blades in vertical alinement with said recess and grooves, so that said pin and said blades may be moved through a pie on said pedestal to a position entirely below the pie with the upper surfaces of said pin and said blades below the flat bottom of said well.

5. A slicer for dividing a pie or similarly shaped article into sectors comprising a pedestal having a lower body portion a removable top slidable laterally on said body portion and provided with a central flat-bottomed recess shaped to receive and to position a pie, said top having angularly spaced narrow and relatively deep grooves extending radially from its periphery to adjacent its center, a cutter having a ring of a size to receive the pedestal and angularly spaced radial slicer blades of a height less than the depth of said grooves attached to said ring, means connected to the body portion of said pedestal for supporting said cutter for vertical movement with said ring in axial alinement with said pedestal and said blades in vertical alinement with said grooves and for guiding the cutter for vertical movement from a position in which said ring surrounds the pedestal and said blades are positioned in said grooves entirely below the flat bottom of said recess, and means including a dowel between the body portion of said pedestal and said removable top to position the grooves of said top in vertical alinement with said slicer blades and to prevent sliding movement of said top on said body portion.

References Cited in the file of this patent

UNITED STATES PATENTS

| | | |
|---|---|---|
| 850,022 | Lewis | Apr. 9, 1907 |
| 1,453,367 | Schipplock et al. | May 1, 1923 |
| 1,496,494 | Selvig | June 3, 1924 |
| 1,800,706 | Turnquist | Apr. 14, 1931 |
| 2,297,177 | Tiffany | Sept. 29, 1942 |

FOREIGN PATENTS

| | | |
|---|---|---|
| 445,512 | France | Sept. 5, 1912 |
| 564,844 | France | Oct. 30, 1923 |
| 484,595 | Germany | Oct. 21, 1929 |
| 379,926 | Great Britain | Sept. 8, 1932 |
| 966,883 | France | Mar. 15, 1950 |